United States Patent
Dumitru et al.

(10) Patent No.: US 12,289,411 B2
(45) Date of Patent: Apr. 29, 2025

(54) COMPREHENSIVE STORAGE APPLICATION PROVISIONING USING A PROVISIONING SOFTWARE DEVELOPMENT KIT (SDK)

(71) Applicant: Visa International Service Association, San Francisco, CA (US)

(72) Inventors: Cristian Dumitru, Austin, TX (US); Penny Jurss, Leander, TX (US); Sushovan Sarkar, Round Rock, TX (US); Suresh Kalakrishnan, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 173 days.

(21) Appl. No.: 18/044,766

(22) PCT Filed: Sep. 30, 2021

(86) PCT No.: PCT/US2021/052847
§ 371 (c)(1),
(2) Date: Mar. 9, 2023

(87) PCT Pub. No.: WO2022/146516
PCT Pub. Date: Jul. 7, 2022

(65) Prior Publication Data
US 2023/0336349 A1    Oct. 19, 2023

Related U.S. Application Data

(60) Provisional application No. 63/131,954, filed on Dec. 30, 2020.

(51) Int. Cl.
*H04L 9/32* (2006.01)
*H04L 9/14* (2006.01)
*H04L 9/30* (2006.01)

(52) U.S. Cl.
CPC .............. *H04L 9/3213* (2013.01); *H04L 9/14* (2013.01); *H04L 9/3073* (2013.01)

(58) Field of Classification Search
CPC ..... G06F 21/44; G06F 2221/212; H04L 9/14; H04L 9/3073; H04L 9/0822; H04L 9/3213
See application file for complete search history.

(56) References Cited

U.S. PATENT DOCUMENTS

| | | |
|---|---|---|
| 10,601,818 B2 | 3/2020 | Le Saint et al. |
| 10,630,648 B1 | 4/2020 | Borunda et al. |
| (Continued) | | |

OTHER PUBLICATIONS

PCT/US2021/052847 , "International Search Report and Written Opinion", Jan. 24, 2022, 10 pages.
(Continued)

*Primary Examiner* — Mohammad A Siddiqi
(74) *Attorney, Agent, or Firm* — Kilpatrick Townsend & Stockton LLP

(57) ABSTRACT

The present embodiments relate to integrated provisioning of a user device to a storage application using a provisioning software development kit (SDK) on a mobile device. A provisioning SDK can receive an encrypted credential and a storage application identifier from a first application on a mobile device and provide the encrypted credential to a processing computer. The processing computer can decrypt the encrypted credential using a first application cryptographic key to obtain the credential and encrypt the credential with the second application cryptographic key. The provisioning SDK can forward the encrypted credential to a storage application server to decrypt the credential encrypted with another second application cryptographic key of the second application key pair. The storage application server can then store the credential or a token asso- (Continued)

ciated with the credential and/or transmit the credential or the token associated with the credential to the second application.

20 Claims, 7 Drawing Sheets

(56) References Cited

U.S. PATENT DOCUMENTS

| | | | | |
|---|---|---|---|---|
| 2011/0098023 A1* | 4/2011 | Hammad | | H04W 12/08 |
| | | | | 235/487 |
| 2011/0159848 A1* | 6/2011 | Pei | | G06F 21/42 |
| | | | | 455/411 |
| 2013/0232083 A1* | 9/2013 | Smith | | G06Q 20/3278 |
| | | | | 705/67 |
| 2014/0250006 A1* | 9/2014 | Makhotin | | G06Q 20/326 |
| | | | | 705/41 |
| 2015/0235256 A1* | 8/2015 | Barsoum | | G06Q 20/02 |
| | | | | 705/14.33 |
| 2016/0094991 A1* | 3/2016 | Powell | | H04W 12/35 |
| | | | | 455/411 |
| 2017/0317922 A1 | 11/2017 | Livak et al. | | |
| 2018/0137272 A1* | 5/2018 | Kamal | | H04W 4/80 |
| 2019/0385164 A1* | 12/2019 | Royyuru | | G06Q 20/36 |
| 2020/0067897 A1 | 2/2020 | Smirnoff et al. | | |
| 2020/0287879 A1 | 9/2020 | Chandoor | | |
| 2020/0396073 A1 | 12/2020 | Venkataraman | | |
| 2021/0241248 A1* | 8/2021 | Lacoss-Arnold | | G06Q 20/36 |

OTHER PUBLICATIONS

Veiga et al., "Proposal and Application of Bluetooth Mesh Profile for Smart Cities Services", Smart Cities, Available Online at: Retrieved from <https://www.mdpi.com/2624-6511/2/1/1>, 2019, pp. 1-19.

EP21916126.2, "Extended European Search Report", Jun. 4, 2024, 5 pages.

* cited by examiner

COMPREHENSIVE STORAGE APPLICATION PROVISIONING USING A PROVISIONING SOFTWARE DEVELOPMENT KIT (SDK)

CROSS-REFERENCES TO RELATED APPLICATIONS

This application is a National Stage of International Application No. PCT/US2021/052847 filed on Sep. 30, 2021 claims priority to U.S. Provisional Patent Application No. 63/131,954, filed Dec. 30, 2020, the contents of which are incorporated by reference herein by their entirety.

BACKGROUND

Mobile devices, such as mobile phones, can implement a number of applications associated with a user device. For example, a user can interact with an application associated with an authorizing entity (e.g., an entity issuing the user device) to view/manage information initiated using a user device.

Further, in many instances, a user can use the authorizing entity application to provision a user device to a storage application. A storage application can include an application capable of securely storing credentials or tokens associated with the user device and perform other actions relating to the user device. For instance, after provisioning the user device to a storage application, the user can interact with the storage application to gain access to a building by providing a token specific to the user device to an access device. In performing a provisioning process, the storage application can obtain a token specific to the user device by interacting with a processing network.

In many cases, the provisioning process can include integrating multiple application programming interfaces (APIs) from multiple sources (e.g., the authorizing entity, the processing network) unique to each of multiple storage applications. Further, each storage application can include a different set of APIs and differing processing to perform the provisioning process. Accordingly, each storage application can include a unique provisioning process to provision a storage application requiring a unique set of API calls to provision a user device to each storage application. This is burdensome for the entities operating the storage applications and the entities that wish to provision the storage applications with credentials or tokens.

Embodiments of the invention address these and other problems.

BRIEF SUMMARY

The present embodiments relate to integrated provisioning of a user device to a storage application using a provisioning software development kit (SDK) on a mobile device. Particularly, the present embodiments can integrate provisioning processes for multiple authorizing entity applications and multiple storage applications to provide an efficient provisioning process across different applications.

One embodiment of the invention includes a method performed by at least a mobile device composing mobile device comprising a processor, and memory coupled to the processor, the memory storing a provisioning SDK, a first application, and a second application, the method comprising: receiving, by the provisioning SDK from the first application on the mobile device an encrypted credential and a storage application identifier; transmitting, by the provisioning SDK, the encrypted credential and the storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair; receiving, by the provisioning SDK, the credential encrypted by the second application cryptographic key; providing, by the provisioning SDK, the credential encrypted with the second application cryptographic key to the second application; and providing, by the second application to a storage application server, the credential encrypted with the second application cryptographic key, wherein the storage application server decrypts the credential encrypted with another second application cryptographic key of the second application key pair, and then (i) stores the credential or a token associated with the credential and/or (ii) transmits the credential or the token associated with the credential to the second application.

Another embodiment of the invention includes a mobile device comprising a processor, and memory coupled to the processor, the memory storing a provisioning SDK, a first application, and a second application, wherein the memory includes instructions causing the processor to: receive, by the provisioning SDK from the first application on the mobile device an encrypted credential and a storage application identifier; transmit, by the provisioning SDK, the encrypted credential and the storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair; receive, by the provisioning SDK, the credential encrypted by the second application cryptographic key; provide, by the provisioning SDK, the credential encrypted with the second application cryptographic key to the second application; and provide, by the second application to a storage application server, the credential encrypted with the second application cryptographic key, wherein the storage application server decrypts the credential encrypted with another second application cryptographic key of the second application key pair, and then (i) stores the credential or a token associated with the credential and/or (ii) transmits the credential or the token associated with the credential to the second application.

Another embodiment of the invention includes a method comprising: receiving, by a processing computer from a provisioning SDK, an encrypted credential and a storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair; and transmitting, by the processing computer to the provisioning SDK, the credential encrypted by the second application cryptographic key, wherein the provisioning SDK provides the credential encrypted with the second application cryptographic key to a second application, and the second application provides the credential encrypted with the second application cryptographic key to a storage application server, wherein the storage application server decrypts the credential encrypted with another second application cryptographic key of the second application key pair, and then (i) stores the credential or a token associated with the credential and/or (ii) transmits the credential or the token associated with the credential to the second application.

These and other embodiments of the invention are described in further detail below.

DETAILED DESCRIPTION

Figure 1:
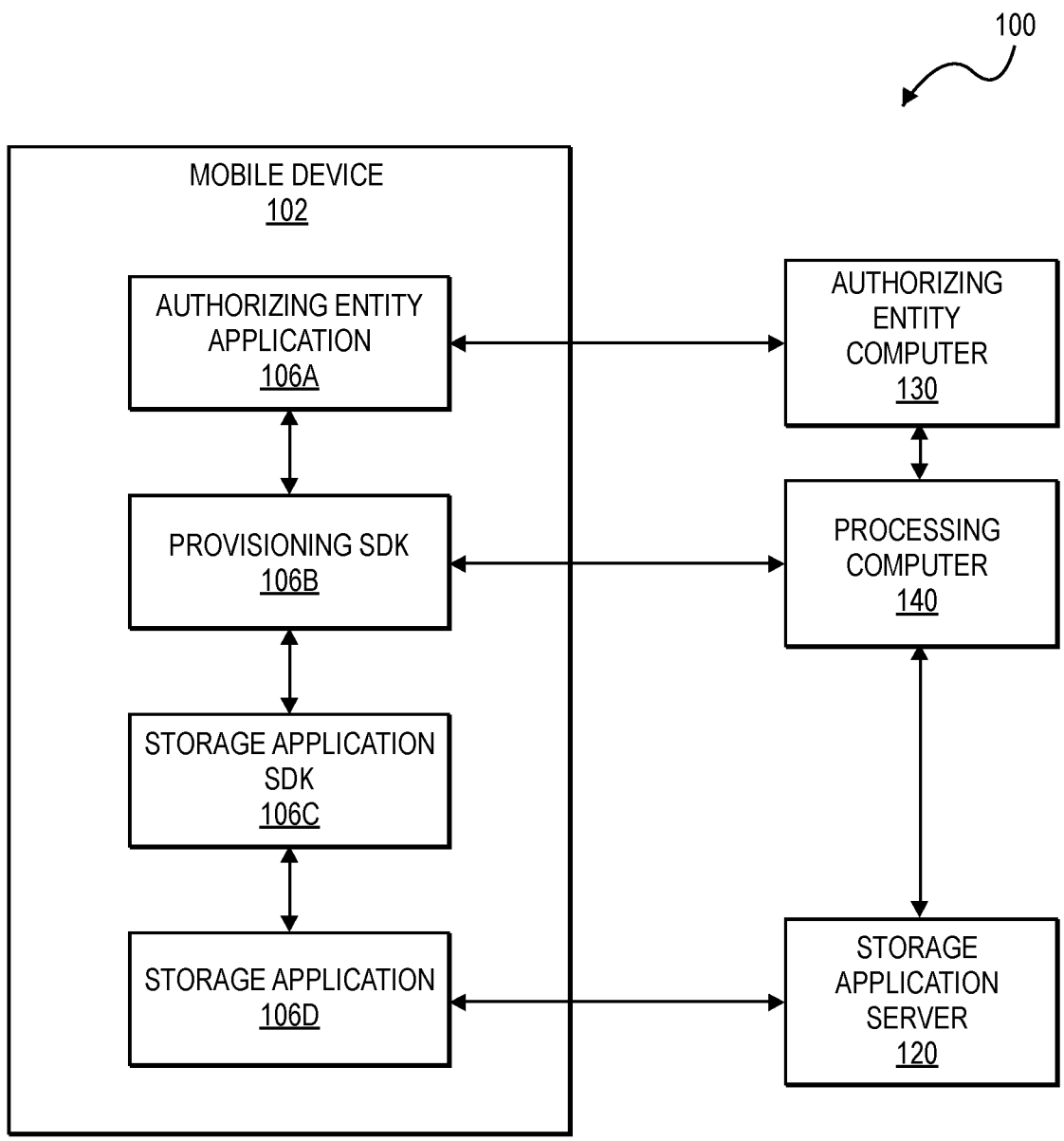
FIG. 1 is a block diagram providing an example system according to an embodiment.

Prior to discussing the details of some embodiments of the present disclosure, description of some terms may be helpful in understanding the various embodiments.

A "user" may include an individual or a computational device. In some embodiments, a user may be associated with one or more personal accounts and/or mobile devices. In some embodiments, the user may be a cardholder, account holder, or consumer.

A "mobile device" (sometimes referred to as a mobile communication device or communications device) may comprise any suitable electronic device that may be transported and operated by a user, which may also provide remote communication capabilities to a network. A mobile device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a user device (or payment device) or payment account. The authorization request message may include an issuer account identifier that may be associated with a user device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network) to the merchant's access device (e.g. POS equipment) that indicates approval of the transaction. The code may serve as proof of authorization. As noted above, in some embodiments, a processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "user device" may include any suitable device that may be used to conduct a financial transaction, such as to provide payment credentials to a merchant. The user device may be a software object, a hardware object, or a physical object. As examples of physical objects, the user device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A user device may be associated with a value such as a monetary value, a discount, or store credit, and a user device may be associated with an entity such as a bank, a merchant, a processing network, or a person. A user device may be used to make a payment transaction. Suitable user devices can be hand-held and compact so that they can fit into a user's wallet and/or pocket (e.g., pocket-sized). Example user devices may include smart cards, magnetic stripe cards, keychain devices (such as the Speedpass™ commercially available from Exxon-Mobil Corp.), etc.

An "application" may be computer code or other data stored on a computer readable medium (e.g. memory element or secure element) that may be executable by a processor to complete a task.

A "storage application" can be an application that can store specific types of data. In some embodiments, a storage application be a digital wallet application.

In embodiments of the invention, a mobile device can include multiple applications associated with a user device such as a payment card. For example, an application can be associated with an authorizing entity that issues a credential (e.g., a primary account number) associated with the user device can allow for viewing/managing transactions initiated using the user device.

The mobile device can also download a storage application to facilitate the initiation of transactions using a token associated with the credential of the user device. The storage application can be provisioned with the token during a provisioning process. The token can be used to conduct a transaction such as an access transaction or a payment transaction.

However, any of a variety of storage applications can be utilized to initiate transactions as described herein. For example, various entities may implement and maintain different storage applications, and each application can include differing features. For example, a single mobile device could have more than ten store applications, some of which may be digital wallet applications. Further, the provisioning process for each storage application can differ. For instance, each storage application can include different APIs and different approaches to perform device eligibility checks and the provisioning processes. For example, a storage application may require a minimum of 15 different API calls across internal authorizing entity APIs and external APIs to perform a provisioning process. Additionally, the storage application can require a separate application responsible for handling the management of encryption keys and hardware security modules (HSMs).

The present embodiments relate to provisioning a storage application with a token associated with a credential of a user device using a provisioning software development kit (SDK) on the mobile device. The provisioning SDK can interact with the storage application and its associated application server, a processing computer, and an authorizing entity application to conduct a provisioning process. In some embodiments, the provisioning SDK can facilitate a verification process between an application associated with an authorizing entity and a processing computer to obtain encrypted credentials. The provisioning SDK can forward the encrypted credentials to the processing computer to decrypt the encrypted credentials, and to identify a list of supported storage applications. Responsive to a selection of a storage application, the provisioning SDK can provide a push provisioning message to the processing computer to initiate a push provisioning process between the processing computer and the storage application. The push provisioning process can include providing an encrypted payload to the storage application and providing a token that corresponds with the credential to the storage application on the mobile device. The token can then be used for initiating a transaction by the storage application.

The provisioning SDK as described herein can manage encrypted credentials according to specifications for each of multiple authorizing entity applications and/or storage applications and manages keys and optionally hardware security modules (HSMs) for such applications. The provisioning SDK can provide an integrated process aggregating processing network and storage application APIs across multiple authorizing entities and mobile application providers.

The present embodiments have a number of advantages. For example, rather than requiring a unique provisioning process using multiple APIS for each storage application, the provisioning SDK can provide a uniform provisioning process. Further, the provisioning SDK can increase efficiency in provisioning a storage application by securely managing interactions between an authorizing entity, processing network, and a storage application.

In particular, the provisioning SDK and the processing computer can serve as an intermediary between a first application such as an authorizing entity application and a second application such as a digital wallet application. The provisioning SDK and the processing computer can check for compatibility between the first and second applications, and can also provide for the secure transfer of data between the applications, even though the first and second application are not in direct communication with each other. The interactions are simplified compared to forming separate connections between all potential application combinations on a mobile device. For instance, all that an authorizing entity needs to do to provision a token for a cardholder's credential to a storage application such as a digital wallet is provide the encrypted credential and a storage application identifier to the provisioning SDK. The provisioning SDK will coordinate the rest of the process to cause the provisioning of the token corresponding to the credential to the storage application. This is much easier than requiring the first and second applications to code to each other so that they can operate in a seamless manner.

FIG. 1 is a block diagram of an example system 100 according to certain embodiments. The system 100 can include a mobile device 102.

The mobile device 102 can be associated with a user. In some embodiments, the mobile device 102 can be a mobile phone. The mobile device 102 can implement any of a variety of applications, such as an authorizing entity application 106A, a provisioning SDK 106B, a storage application SDK 106C, and a storage application 106D. The mobile device 102 is described in greater detail with respect to FIG. 2.

The mobile device 102 can communicate with an authorizing entity computer 130 via the authorizing entity application 106A, and can communicate with a processing computer 140 via a provisioning SDK. The mobile device can also communicate with a storage application server 120 via the storage application 106D and the storage application SDK 106C The processing computer 140 can process data from external computers.

The processing computer 140 can be in a payment processing network. A payment processing network can provide authorization services, and clearing and settlement services for payment transactions. A payment processing network can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services.

The authorizing entity computer 130 may be operated by an account issuer. Typically the issuer is an entity (e.g., a bank) that issues and maintains an account of the user of the mobile device 102. The account may be a credit, debit, prepaid, or any other type of account.

The storage application server 150 can include a server (or series of interconnected servers) specific to a storage application entity. The storage application server 150 can securely store credentials or tokens associated with user devices such as payment cards. The storage application server 150 can be an wallet server and the corresponding storage application can be a digital wallet application, and the storage application SDK can be a wallet application SDK.

Figure 2:
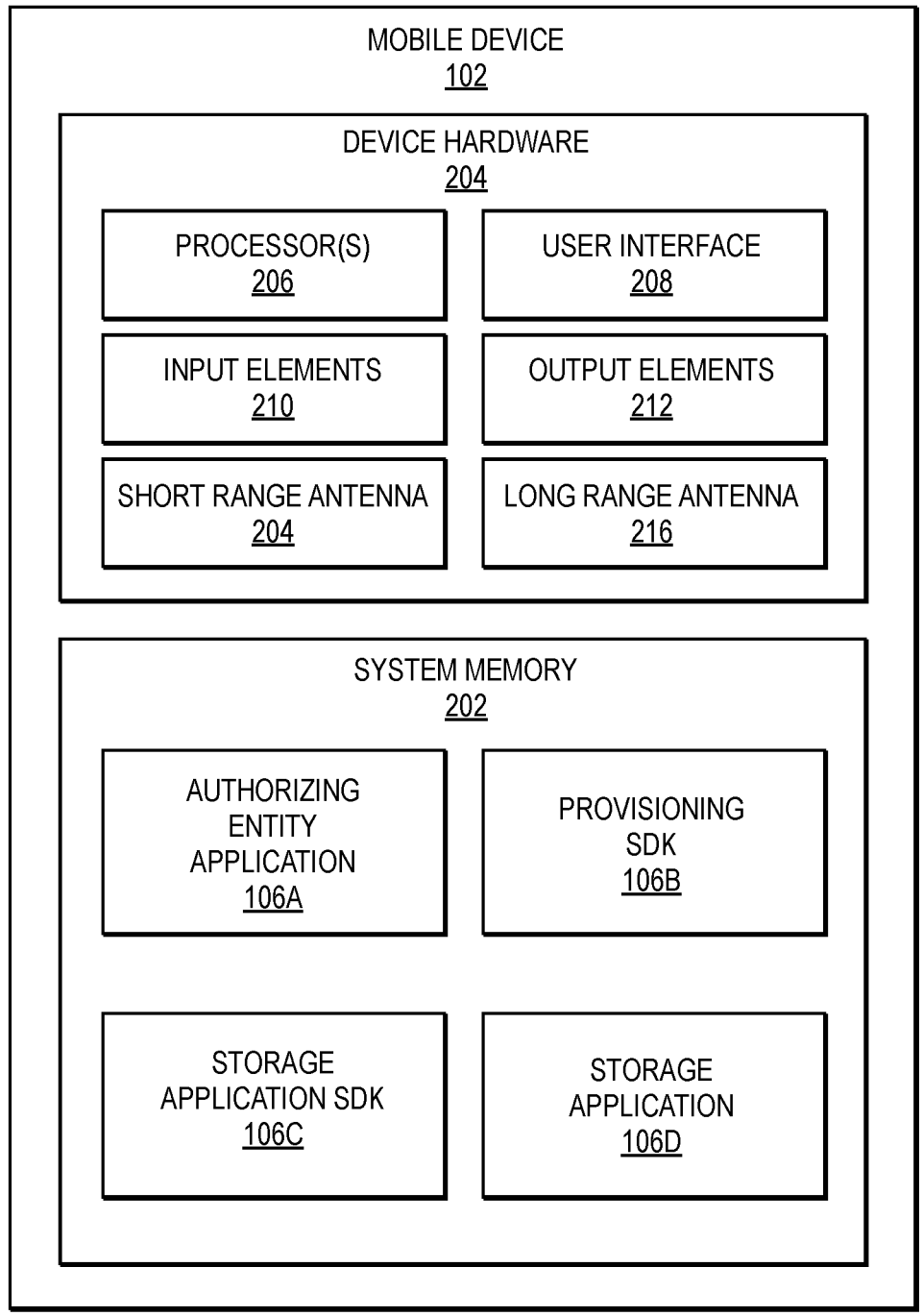
FIG. 2 is a block diagram illustrating an example mobile device according to certain embodiments.

FIG. 2 is a block diagram illustrating an example mobile device 102 according to certain embodiments. The mobile device 102 can include a device (e.g., mobile phone) executing a number of mobile applications and capable of performing processing tasks as described herein. The mobile device 102 can include any of a number of applications (e.g., 106A-D) as described with respect to FIG. 1. The mobile device 102 may include device hardware 204 coupled to a system memory 202.

Device hardware 204 may include a processor 206, a short range antenna 214, a long range antenna 216, input elements 210, a user interface 208, and output elements 212 (which may be part of the user interface 208). Examples of input elements may include microphones, keypads, touchscreens, sensors, etc. Examples of output elements may include speakers, display screens, and tactile devices. The processor 206 can be implemented as one or more integrated circuits (e.g., one or more single core or multicore microprocessors and/or microcontrollers), and is used to control the operation of mobile device 102. The processor 206 can execute a variety of programs in response to program code or computer-readable code stored in the system memory 202, and can maintain multiple concurrently executing programs or processes.

The long range antenna 216 may include one or more RF transceivers and/or connectors that can be used by communication device 200 to communicate with other devices and/or to connect with external networks. The user interface 208 can include any combination of input and output elements to allow a user to interact with and invoke the functionalities of communication device 200. The short range antenna 214 may be configured to communicate with external entities through a short range communication medium (e.g. using Bluetooth, Wi-Fi, infrared, NFC, etc.). The long range antenna 216 may be configured to communicate with a remote base station and a remote cellular or data network, over the air.

The system memory 202 can be implemented using any combination of any number of non-volatile memories (e.g., flash memory) and volatile memories (e.g. DRAM, SRAM), or any other non-transitory storage medium, or a combination thereof media. The system memory 202 may store computer code, executable by the processor 206, for performing any of the functions described herein. For example, the system memory 202 may comprise a computer readable medium comprising code, executable by the processor 206, for implementing a method as described herein.

The system memory 202 can have an authorizing entity application 106A. The authorizing entity application 106A can include an application that allows for viewing/managing features relating to one or more user devices associated with an authorizing entity. For example, the user, via authorizing entity application 106A, can initiate a request to provision a credential associated selected user device. As will be described in detail below, the authorizing entity application 106A can forward an application identifier identifying the authorizing entity application 106A to register the mobile device 102 and the authorizing entity application 106A at a processing computer.

The system memory 202 can also store a provisioning SDK 106B. The provisioning SDK 106B allow the mobile device 102 to communicate directly with the processing computer. As will be described below, the provisioning SDK 106B can receive an encrypted credential encrypted with a first application cryptographic key, and a storage application identifier from authorizing entity application 106A and forward the encrypted credential and the storage application identifier to the processing computer. The processing computer can decrypt the encrypted credential using a corresponding first application cryptographic key, and then re-encrypt the credential with a second application cryptographic key. The provisioning SDK 106B can receive the credential encrypted by the second application cryptographic key and provide the credential encrypted with the second application cryptographic key to the storage application 106D via storage application SDK 106C.

The system memory 202 can also implement a storage application SDK 106C. The storage application SDK 106C can be associated with the storage application 106D.

The system memory 202 can also implement a storage application 106D. The storage application 106D can include an application associated with a storage application server. The storage application 106D can securely storing a credential/token specific to a user device. The storage application 106D can provide the credential/token in a transaction conducted using the mobile device 102.

The memory 202 may comprise a computer readable medium, which comprises code which causes the processor to: receive, by the provisioning SDK from the first application on the mobile device an encrypted credential and a storage application identifier; transmit, by the provisioning SDK, the encrypted credential and the storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair; receive, by the provisioning SDK, the credential encrypted by the second application cryptographic key; provide, by the provisioning SDK, the credential encrypted with the second application cryptographic key to the second application; and provide, by the second application to a storage application server, the credential encrypted with the second application cryptographic key, wherein the storage application server decrypts the credential encrypted with another second application cryptographic key of the second application key pair, and then (i) stores the credential or a token associated with the credential and/or (ii) transmits the credential or the token associated with the credential to the second application.

As described above, an authorizing entity, via an authorizing entity computer 130 can allow for secure storage of credentials associated with one or more user devices associated with a user. Further, a user can manage various aspects of a user device by interacting with the authorizing entity computer 130.

Figure 3:
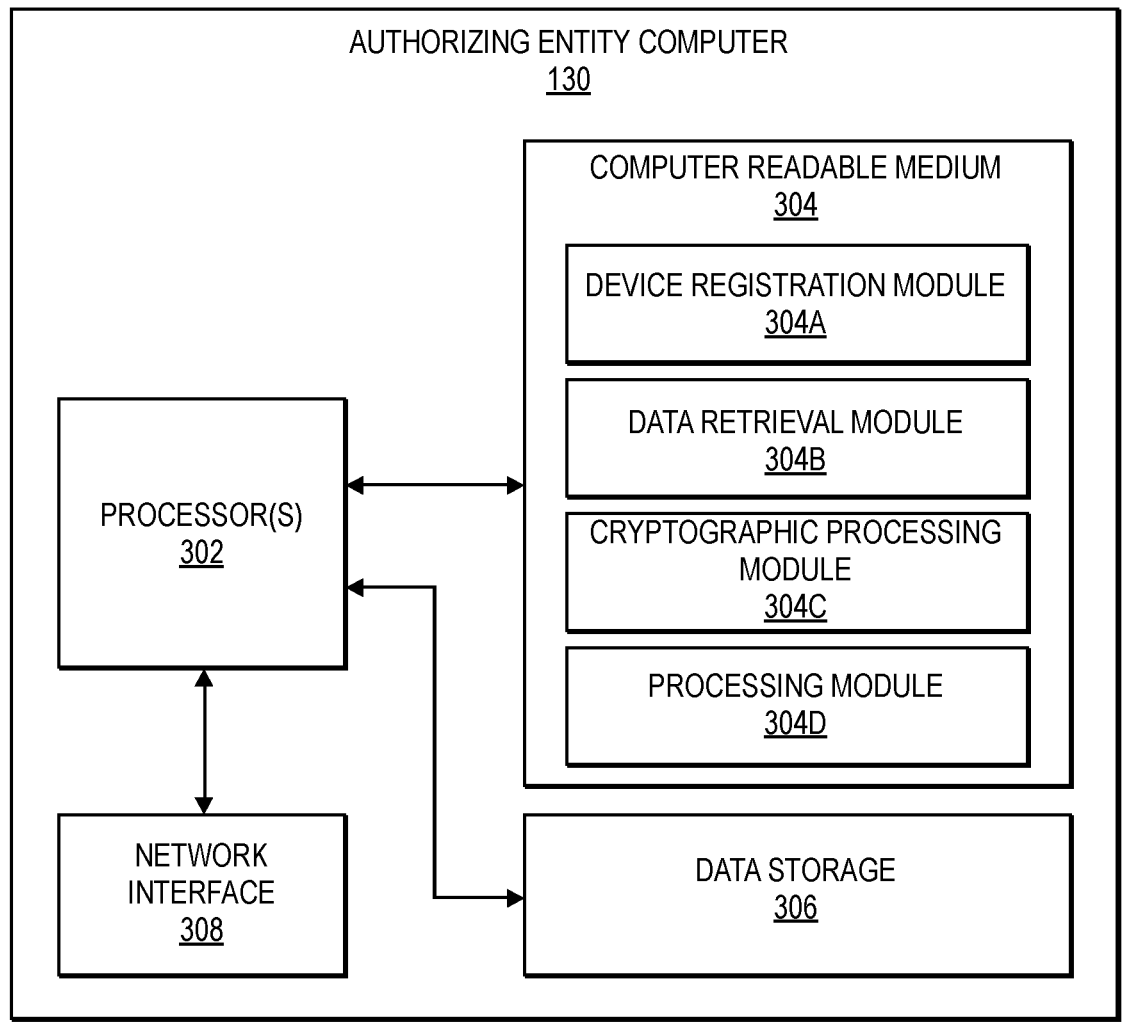
FIG. 3 is an illustration of an example authorizing entity computer according to certain embodiments.

FIG. 3 is an illustration of an example authorizing entity computer 130 according to certain embodiments. The authorizing entity computer 130 can include a processor 302 and a computer readable medium 304, a data storage module 306, and a network interface 308 coupled to the processor 302.

The computer readable medium 304 can implement a device registration module 304A. The device registration module 304A can register one or more user devices associated with a user. For instance, a user can provide user device details to provision a user device to the authorizing entity computer 130 using the device registration module 304A. In another example, a user can provide a credential (e.g., username and password) to access the user device via the authorizing entity application using the device registration module 304A.

The computer readable medium 304 can also implement a data retrieval module 304B. The data retrieval module 304B can obtain credentials associated with a specific user device responsive to obtaining a request to retrieve the credential for the user device. The credentials obtained by data retrieval module 304B can be encrypted by a cryptographic processing module 304C on the computer readable medium 304. The cryptographic processing module 304C can encrypt the credentials using a first application cryptographic key of a first application cryptographic key pair shared between the processing computer and an authorizing entity computer.

The computer readable medium 304 can also implement a processing module 304D. The processing module 304D can process requests obtained by the provisioning SDK, such as to provide the encrypted credentials to the provisioning. Further, the processing module 304D can process other requests associated with a user device, such as to provide transaction details (e.g., a transaction history) associated with a user device.

The data storage 306 can securely store various data relating to user devices. For example, the data storage module 306 can store user device details, such as a PAN, CVV, expiration date, user details (e.g., user name, passwords, user address, phone number), account data, and data relating to other user devices associated with the user device. The data storage 306 can maintain transaction details (e.g., a transaction history, previous user device provisioning requests) for each user device associated with a user.

Figure 4:
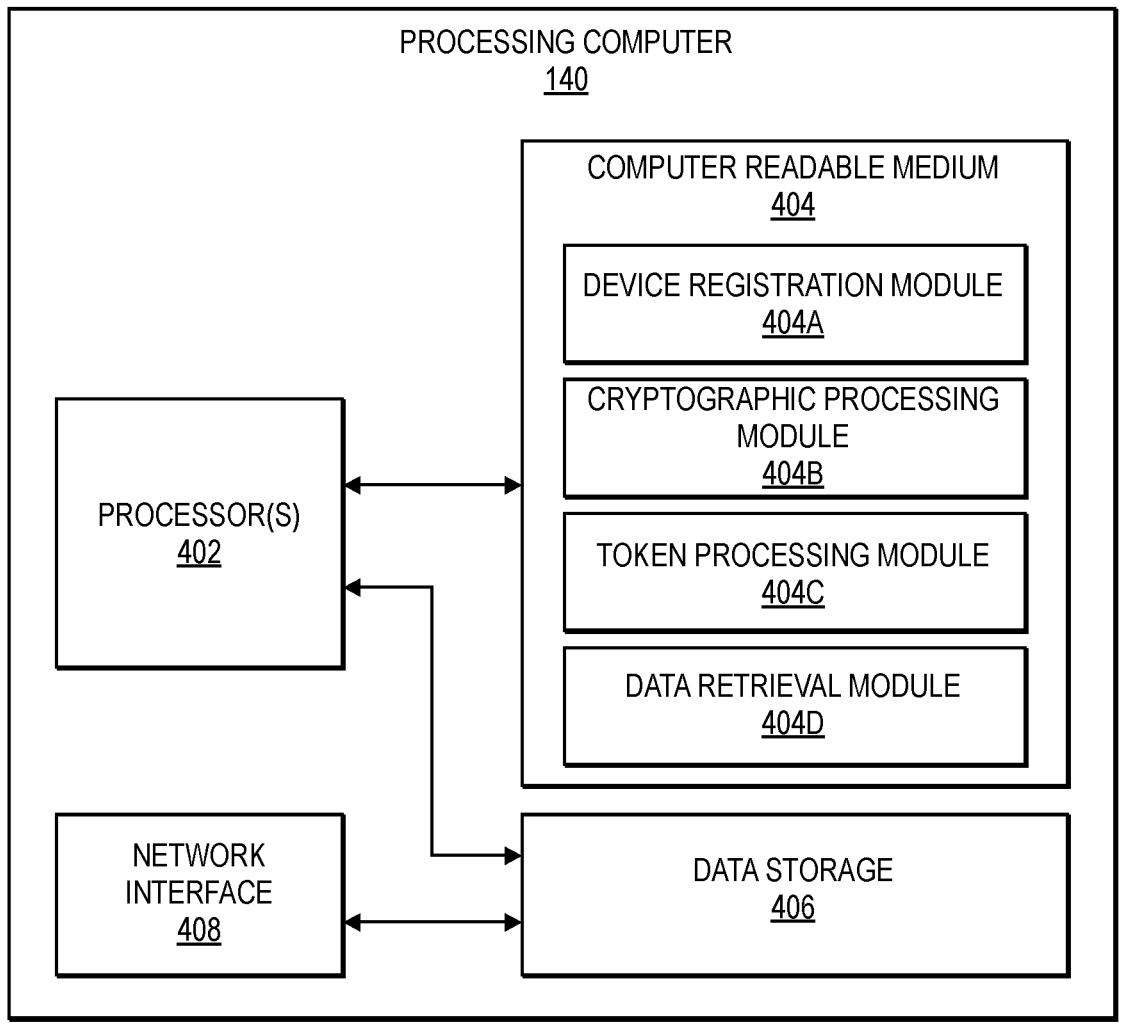
FIG. 4 is an illustration of an example processing computer according to certain embodiments.

FIG. 4 is an illustration of an example processing computer 140 according to certain embodiments. The processing computer 140 can include a processor 402 and a computer readable medium 404, a data storage module 406, and a network interface 408 coupled to the processor 402.

The computer readable medium 404 can implement a device registration module 404A. The device registration module 404A can register a mobile device by mapping the mobile device and an authorizing entity application using the application identifier. The device registration module 404A can further map the user device, the authorizing entity, and the storage application for provisioning the user device to the storage application. The device registration module 404A can store mappings between the mobile device and the authorizing entity application and between the user device and the storage application in data storage module at data storage module 406.

The computer readable medium 404 can also implement a cryptographic processing module 404B. The cryptographic processing module 404B can encrypt/decrypt credentials for a user device to implement the provisioning process as described herein. For instance, the cryptographic processing module 404B can decrypt an encrypted credential using a first application cryptographic key to obtain the credential, identify a second application cryptographic key using a storage application identifier, and encrypt the credential with a second application cryptographic key. Any of the first application cryptographic key can be one of a first application cryptographic key pair, and the second application cryptographic key can be one of a second application cryptographic key pair. The first application cryptographic key and/or the second application cryptographic key can be maintained by the data storage 406.

The computer readable medium 404 can also implement a token processing module 404C. The token processing module 404C can generate or obtain a token for provisioning. The token proceeding module 404C can also exchange the token for a credential, and vice-versa. The token processing module 404C may also maintain rules or restrictions on how tokens may be used. The mapping between each generated token and a credential for each provisioned user device can be maintained by the data storage 406.

The computer readable medium 404 can also implement a data retrieval module 404D. The data retrieval module 404D can retrieve a credential for a user device responsive to a obtaining a request for the credential. For example, to provision a user device to a storage application, the data retrieval module 404D can identify a corresponding credential for the user device for the data storage module 406 and encrypt the credential as described herein.

The computer readable medium 404 can also comprise code, executable by the processor for implementing a method comprising: receiving, by the processing computer from a provisioning SDK, an encrypted credential and a storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair; and transmitting, by the processing computer to the provisioning SDK, the credential encrypted by the second application cryptographic key, wherein the provisioning SDK provides the credential encrypted with the second application cryptographic key to a second application, and the second application provides the credential encrypted with the second application cryptographic key to a storage application server, wherein the storage application server decrypts the credential encrypted with another second application cryptographic key of the second application key pair, and then (i) stores the credential or a token associated with the credential and/or (ii) transmits the credential or the token associated with the credential to the second application.

Figure 5:
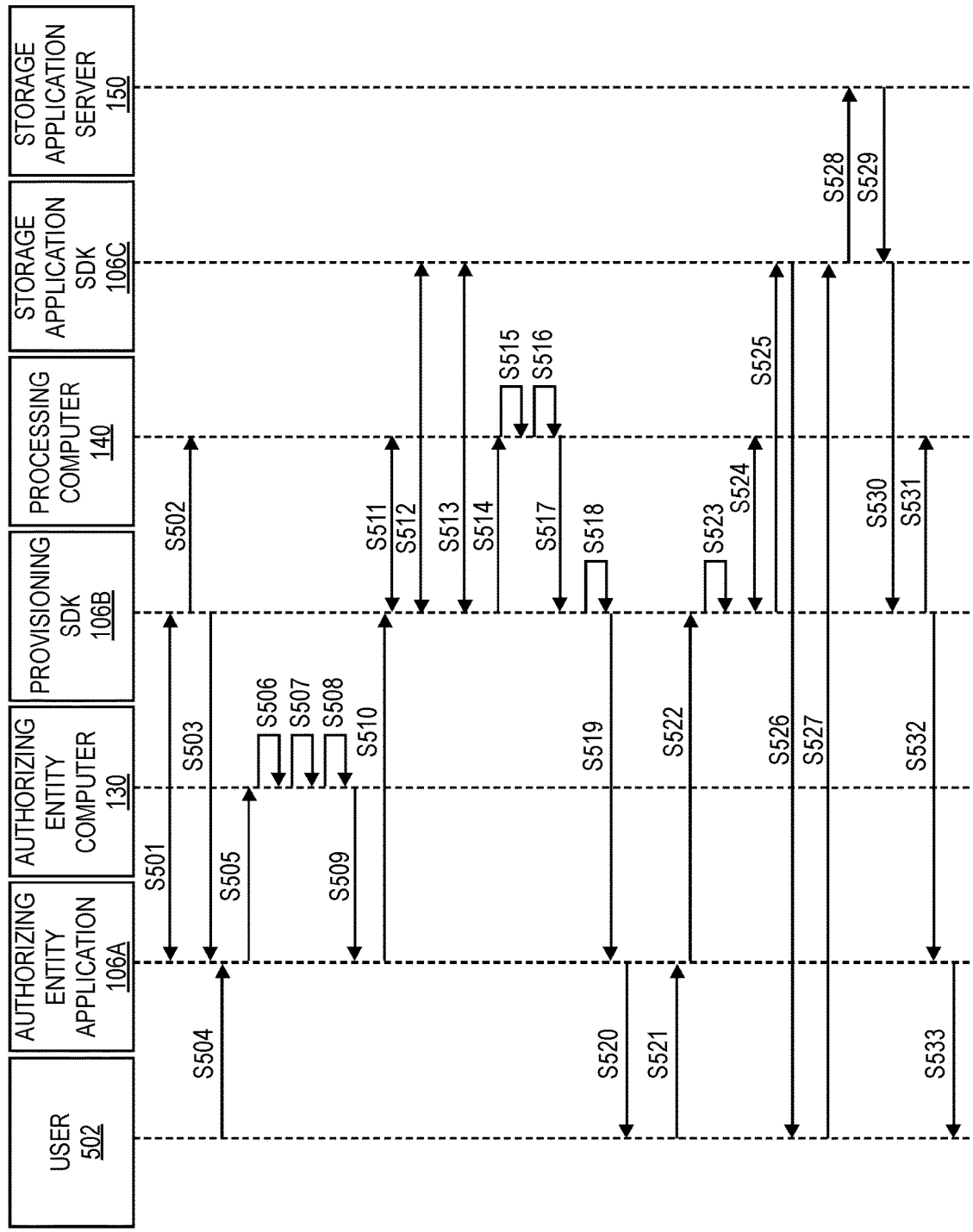
FIG. 5 is a flow diagram illustrating a method according to certain embodiments.

As noted above, a provisioning SDK on a mobile device can provide a uniform and secure process to provision a storage application to access a user device. The user can provide user device details to the storage application directly using the provisioning process, eliminating a need to separately provide user device details to the storage application. The provisioning SDK can integrate multiple provisioning processes to provide a uniform provisioning process across multiple storage applications. FIG. 5 is a signaling process 500 illustrating an example integrated provisioning process according to certain embodiments.

At S501, an authorizing entity application (or a third-party mobile application) 106A can initialize the provisioning SDK 1066 with an application identifier. The application identifier can uniquely identify the authorizing entity.

At S502, the provisioning SDK 1066 can provide the application identifier to the processing computer 140. The processing computer 140 can register the mobile device by mapping the mobile device and the application 106A using the application identifier. The processing computer 140 can provide a signed nonce to the provisioning SDK 106B. The application identifier can be used to determine storage applications in which the application is eligible to be used. For example, if the application identifier identifies a particular financial institution, then payment devices associated with that financial institution may only be useable with certain digital wallet applications.

At S503, the provisioning SDK 106B can provide a verification to the authorizing entity application 106A with the signed nonce. The signed nonce can be used to bind the authorizing entity application 106A with the processing computer 140.

At S504, the user can interact with the authorizing entity application 106A to view one or more user devices and can select a user device to be provisioned. The authorizing entity application 106A can cause display of all user devices associated with the user.

At S505, the authorizing entity application 106A can make a request to an authorizing entity computer 130 for encrypted user device details. The request can include a user device identifier for the selected user device, and the signed nonce provided by the provisioning SDK 106B. The user device identifier may be pre-loaded onto the authorizing entity application 106A.

At S506, the authorizing entity computer 130 may verify the signed nonce using a shared secret received during onboarding with the processing computer 140. For instance, the authorizing entity computer 130 can decrypt the signed nonce using a first application cryptographic key in a key pair shared between the server computer and the processing network to verify the signed nonce as corresponding with the processing computer 140. In other embodiments, the nonce may have been signed using a private key held by the provisioning SDK or the processing computer 140, and the authorizing entity computer 130 can verify the signed nonce with a public key corresponding to the private key.

At S507, the authorizing entity computer 130 can retrieve user device information (e.g., PAN, card verification value (CVV), a service code, etc.) associated with the user device identifier. The user device information may be retrieved by sending the user device identifier to a database storing user device information by the authorizing entity.

At S508, the authorizing entity computer 130 can encrypt and sign the user device information using the shared secret received during onboarding with the processing network. The encrypted user device data may be encrypted such that only the processing network can decrypt the encrypted user device data using the first application cryptographic key shared between the server computer and the processing network. In some embodiments, the first application cryptographic key held by both the processing computer 140 and the authorizing entity computer 130 is a symmetric key.

At S509, the authorizing entity computer 130 can send the encrypted user device information to the authorizing entity application 106A. The authorizing entity application 106A can route the encrypted user device information to the processing computer 140 via the provisioning SDK 106B.

At S510, the authorizing entity application 106A can request a list of supported wallets from the provisioning SDK 106B. The request can include the encrypted credential encrypted using the first application cryptographic key shared between the authorizing entity computer 130 and the processing computer 140.

In some instances, a second application as described herein comprises a storage application and a storage application SDK, and the mobile device comprises a plurality of different storage application SDKs and associated storage applications. Further, prior to receiving the encrypted credential and the storage application identifier, the provisioning SDK 1066 can receive a request to identify supported storage applications from the first application (e.g., authorizing entity application 106A). The request can comprise the encrypted credential. The provisioning SDK 1066 or its associated processing computer 140 can also decrypt the encrypted credential using another first application cryptographic key and verify if the credential is compatible with the storage applications with the plurality of different storage applications. The provisioning SDK 106B or its associated processing computer 140 can also provide a list of supported storage applications to the first application (e.g., authorizing entity application 106A).

At S511, the provisioning SDK 106B can validate the encrypted credential with the processing computer 140. The processing computer 140 can decrypt the encrypted credential using the first application cryptographic key. Further, the processing computer 140 may return features specific to the authorizing entity application, such as previously set parameters, preexisting verification checks, predefined storage applications corresponding with the user device, etc.

At S512, the provisioning SDK 106B will perform an eligibility check using the decrypted credential to determine whether the storage application using a storage application SDK 106C can accept a token corresponding to the decrypted credential. For instance, the provisioning SDK 106B can pass user device details (e.g., branding content for the user device, a portion of a PAN) to the storage application SDK 106C to determine if the user device (i.e., a token associated with the user device) is eligible for provisioning. In response, the storage application SDK 106C can provide data to the provisioning SDK 106B (e.g., whether the branding content corresponds with the storage application) for verifying the eligibility of the storage device.

At S513, in other optional embodiments, the provisioning SDK 1066 can request a storage application ID and device ID from the storage application SDK 106C. In response, the storage application SDK 106C can provide the storage application ID and device ID by interacting with storage application server 150.

At S514, the provisioning SDK 106B can perform an eligibility check to determine whether the user device is eligible to be provisioned on the storage application. For instance, the provisioning SDK 106B can provide the encrypted credential, a storage application ID, and the mobile device ID to the processing computer 140.

At S515, the processing computer 140 can verify the encrypted credential by decrypting the credential using the first application cryptographic key.

At S516, the processing computer 140 can perform an eligibility check using the decrypted credential. This can include identifying all storage applications that support the user device and determining whether the user device corresponds with the selected storage application.

At S517, the processing computer 140 can return the result of the eligibility check to the provisioning SDK 106B. The result can indicate that the storage application is supported or is not supported.

At S518, the provisioning SDK 106B can interact with processing computer 140 to generate a list of supported storage applications for the user device and determine whether the selected storage application is included in the list of supported storage applications. For example, determining that the storage application is supported can include determining that the selected storage application is included in the list of supported storage applications.

At S519, the provisioning SDK 106B can pass the list of supported storage applications to the authorizing entity application 106A. The authorizing entity application 106A can then cause display of the list of supported storage applications on the mobile device.

At S520, the authorizing entity application 106A may display a screen on the mobile device with the list of supported storage applications which may be used for provisioning. The authorizing entity application 106A may also display the storage applications which were already provisioned.

At S521, the user may select a first storage application to provision the selected user device. For example, the user can select an interface corresponding with a first storage application in the list of supported storage applications.

At S522, the authorizing entity application 106A can forward a provisioning request identifying the first storage application selected by the user to the provisioning SDK 106B. The request may include any of the encrypted credential (encrypted with the first application cryptographic key), a first storage application identifier, and any other options specified by the user on the mobile device.

At S523, the provisioning SDK 106B can prepare the user device for provisioning. This can include interacting with the processing computer 140 to identify the storage application selected by the user and the second application cryptographic key for the storage application using the storage application identifier.

At S524, the provisioning SDK 106B can send the encrypted credential and the storage application identifier to the processing computer 140. The processing computer 140 can decrypt the encrypted credential with the first application cryptographic key. The processing computer 140 can then use the storage application identify to identify a second application cryptographic key associated with the storage application and the storage application server 150, and can re-encrypt the credential with the second application cryptographic key. The second application cryptographic key pair can be a symmetric key pair shared between the storage application server 150 and the processing computer 140.

At S525, the provisioning SDK 106B can send a provisioning request that includes the encrypted credential (encrypted with the second application cryptographic key) to the storage application SDK 106C. The storage application SDK 106C can forward the request to the storage application server 150 for decryption of the encrypted credential using the second application cryptographic key.

At S526, the storage application SDK 106C can cause display of a set of terms and conditions on the mobile device. The terms and conditions can be specific to the storage application and can include an interface to accept or reject the terms and conditions.

At S527, the user, on the mobile device, may accept the terms and conditions sent by the storage application SDK 106C. The user can select an interface on the display of the mobile device accepting the terms and conditions.

At S528, the storage application SDK 106C can send the encrypted credential, the storage application ID, and a device ID to the storage application server 150. The storage application server 150 can decrypt the credential encrypted with another second application cryptographic key of the second application key pair.

Now, in steps that are not specifically illustrated in FIG. 5, the storage application server 150 has the credential, and it may obtain a token associated with the credential from a token processing module in the processing computer 140. The processing computer 140 can generate or obtain a token, and can store the token with the credential in a database. The processing computer 140 may also generate a token reference ID which can be used to identify the token, and store it along with the credential and the token. The token reference ID may also be considered a "token" as it is a substitute for a credential such as a primary account number, but they are linked via a token.

At S529, the storage application server 150 can provide the token reference ID to the storage application SDK 106C.

At S530, the storage application SDK 106C can return the token reference ID to the provisioning SDK 106B. In other embodiments, the token can be provided instead of the token reference ID in S529 and S530.

At S531, the provisioning SDK 106B can confirm the provisioning with the processing computer 140. For instance, the provisioning SDK 106B can forward the token reference ID to the processing computer 140. The processing computer 140 can map the token reference ID with the token and the credential for the subsequent exchanging of the token for a credential as described herein.

At S532, the provisioning SDK 106B can send a success message to the authorizing entity application 106A.

At S533, the authorizing entity application 106A may display the success message on the mobile device. The success message can specify that a transaction can be initiated using the user device on the storage application. For example, a user can interact with storage application 106D to initiate a transaction using the token in an authorization request message. The storage application 106D can forward the request to the processing computer 140, which then can exchange the token for the credential and pass the authorization request message for final authorization.

Figure 6:
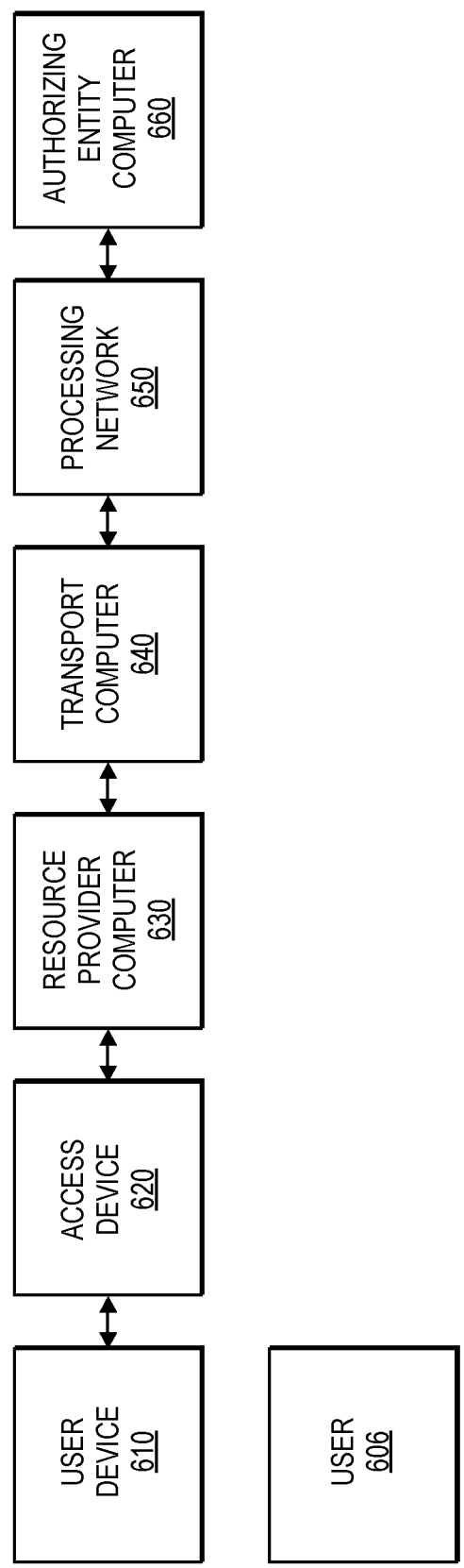
FIG. 6 shows a block diagram of a transaction processing according to certain embodiments.

FIG. 6 shows a block diagram of a transaction processing system 600 that can use a user device with access data (e.g., a token) according to certain embodiments. FIG. 6 shows a user 606 that can operate a user device 610 with a token or token reference ID that has been provisioned as described above. The user 606 may use the user device 610 to pay for a good or service at a resource provider such as a merchant. The merchant may operate a resource provider computer 630 and/or an access device 620. The merchant may communicate with an authorizing entity computer 660 operated by an issuer, via a transport computer 640 operated by an acquirer and a processing network 650 such as a payment processing network.

A typical payment transaction flow using a user device 610 at an access device 620 (e.g., POS location) can be described as follows. A user 606 presents his or her user device 610 to an access device 620 to pay for an item or service. The user device 610 and the access device 620 interact such that access data from the user device 610 (e.g., a payment token, verification value(s), expiration date, etc.) is received by the access device 620 (e.g., via contact or contactless interface). The resource provider computer 630 may then receive this information from the access device 620 via an external communication interface. The resource provider computer 630 may then generate an authorization request message that includes the information received from the access device 620 (i.e. information corresponding to the user device 610) along with additional transaction information (e.g., a transaction amount, merchant specific information, etc.) and electronically transmits this information to a transport computer 640. The transport computer 640 may then receive, process, and forward the authorization request message to a processing network 650 for authorization.

In general, prior to the occurrence of a credit or debit-card transaction, the processing network 650 has an established protocol with each issuer on how the issuer's transactions are to be authorized. In some cases, such as when the transaction amount is below a threshold value, the processing network 650 may be configured to authorize the transaction based on information that it has about the user's account without generating and transmitting an authorization request message to the authorizing entity computer 660. In other cases, such as when the transaction amount is above a threshold value, the processing network 650 may receive the authorization request message, determine the issuer associated with the user device 610, and forward the authorization request message for the transaction to the authorizing entity computer 660 for verification and authorization. Once the transaction is authorized, the authorizing entity computer 660 may generate an authorization response message (that may include an authorization code indicating the transaction is approved or declined) and transmit this electronic message via its external communication interface to processing network 650. The processing network 650 may then forward the authorization response message to the transport computer 640, which in turn may then transmit the electronic message to comprising the authorization indication to the resource provider computer 630, and then to the access device 620.

If the access data is in the form of a token or a token reference identifier, then the processing network 650 may exchange the token for a real credential (e.g., a PAN), or the token reference identifier for a token, and then the token for a real credential. Any authorization request message may then be modified to include the real credential and it may be forward to the authorizing entity computer 660 for verification. The authorizing entity computer 660 can generate an authorization response message with an approval or decline. The authorization response message can be transmitted to the processing network 650, and the processing network 650 may replace the credential with the token. The processing network 650 may then transmit the authorization response message back to the access device 620.

At the end of the day or at some other suitable time interval, a clearing and settlement process between the resource provider computer 630, the transport computer 640, the processing network 650, and the authorizing entity computer 660 may be performed on the transaction.

As described above, a user device can be provisioned on a storage application. The storage application can securely store a token representing the user device such that the user interacting with the storage application can perform an action. An example action can include interacting with an access device to gain access to an environment (e.g., a building).

Figure 7:
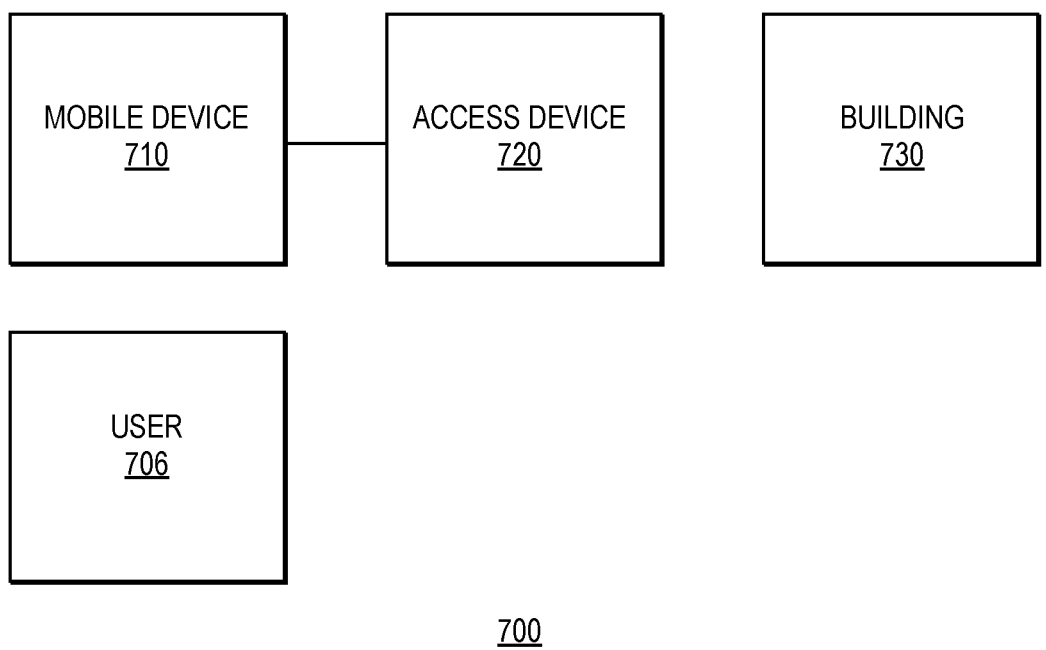
FIG. 7 is a block diagram of an access control system according to certain embodiments.

FIG. 7 is a block diagram illustrating an example system 700 for provisioning of a storage application on a mobile device to permit access to an environment according to certain embodiments. In the example as shown in FIG. 7, a mobile device 710 can interact with an access device 720 to gain access to a building 730. For instance, the mobile device 710 can provide a token or a credential to an access device 720 to obtain access to a location (e.g., building 730).

For example, user 706 can access a storage application on the mobile device 710 to send a request to access the building 730 to the access device 720. In this example, the user device can include a credential associated with a user to gain access to the building 730. The user device can be provisioned on a storage device to allow for access to the building 730 using the storage application. Further, the process to provision a user device on a storage application as described herein can provide an integrated process across multiple authorizing entity applications and multiple storage applications.

Particularly, the storage application on the mobile device 710 can provide a token to the access device 720. In response, the access device 720 can validate the token by determining that the token is included in a listing of tokens allowed access to the building 730 stored at the access device 720 and/or a remote server associated with the access device 720. Responsive to determining that the user is allowed access to the building 730, the access device 720 can perform an action, such as to unlock a door lock, to permit access to the building 730.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A method performed by a mobile device comprising a processor, and memory coupled to the processor, the memory storing a provisioning software development kit (SDK), a first application, and a second application, the method comprising:

receiving, by the provisioning SDK from the first application on the mobile device an encrypted credential and a storage application identifier;

transmitting, by the provisioning SDK, the encrypted credential and the storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair;

receiving, by the provisioning SDK, the credential encrypted by the second application cryptographic key;

providing, by the provisioning SDK, the credential encrypted with the second application cryptographic key to the second application; and providing, by the second application to a storage application server, the credential encrypted with the second application cryptographic key, wherein the storage application server decrypts the credential encrypted with another second application cryptographic key of the second application key pair, and then (i) stores the credential or a token associated with the credential and/or transmits the credential or the token associated with the credential to the second application.

2. The method of claim 1, wherein the first application is an authorizing entity application and the second application is a storage application.

3. The method of claim 1, wherein the second application comprises a storage application and a storage application SDK.

4. The method of claim 1, wherein the second application comprises a storage application SDK.

5. The method of claim 1, further comprising:

receiving, by the second application on the mobile device, the credential or the token from the storage application server; and storing the credential or the token on the mobile device in association with the second application.

6. The method of claim 5, wherein the token is received from the storage application server and is stored on the mobile device.

7. The method of claim 5, wherein the token is a reference identifier for a substitute for the credential, or is the substitute for the credential.

8. The method of claim 5, further comprising:

providing, by the mobile device, the token or the credential to an access device to obtain access to a location.

9. The method of claim 1, wherein the storage application server transmits the credential to the processing computer, and receives the token in exchange for the credential.

10. The method of claim 1, wherein the second application comprises a storage application and a storage application SDK, and wherein the mobile device comprises a plurality of different storage application SDKs and associated storage applications, and wherein prior to receiving the encrypted credential and the storage application identifier, receiving by the provisioning SDK from the first application, a request to identify supported storage applications, the request comprising the encrypted credential;

decrypting the encrypted credential using another first application cryptographic key;

verifying, by the provisioning SDK with the plurality of different storage application SDKs if the credential is compatible with each of the plurality of different storage application SDKs; and providing by the provisioning SDK a list of supported storage applications to the first application.

11. The method of claim 10, wherein the first application is an authorizing entity application.

12. The method of claim 1, further comprising:

receiving, by the second application on the mobile device, the token from the storage application server; and storing the credential or the token on the mobile device in association with the second application.

13. The method of claim 12, further comprising:

providing, by the second application to the provisioning SDK, the token; and providing, by the provisioning SDK to the processing computer, the token, wherein the processing computer stores the token along with the credential.

14. The method of claim 1, wherein the first application cryptographic key is a symmetric key and the second application cryptographic key is also a symmetric key.

15. A mobile device comprising a processor, and memory coupled to the processor, the memory storing a provisioning software development kit (SDK), a first application, and a second application, wherein the memory includes instructions causing the processor to:

receive, by the provisioning SDK from the first application on the mobile device an encrypted credential and a storage application identifier;

transmit, by the provisioning SDK, the encrypted credential and the storage application identifier to a processing computer, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair;

receive, by the provisioning SDK, the credential encrypted by the second application cryptographic key;

provide, by the provisioning SDK, the credential encrypted with the second application cryptographic key to the second application; and provide, by the second application to a storage application server, the credential encrypted with the second application cryptographic key, wherein the storage application server decrypts the credential encrypted with another second application cryptographic key of the second application key pair, and then (i) stores the credential or a token associated with the credential and/or (ii) transmits the credential or the token associated with the credential to the second application.

16. A method comprising: receiving, by a processing computer from a provisioning software development kit (SDK), an encrypted credential and a storage application identifier, wherein the processing computer decrypts the encrypted credential using a first application cryptographic key to obtain the credential, identifies a second application cryptographic key using the storage application identifier, and encrypts the credential with the second application cryptographic key, wherein the second application cryptographic key is one of a second application key pair; and transmitting, by the processing computer to the provisioning SDK, the credential encrypted by the second application cryptographic key, wherein the provisioning SDK provides the credential encrypted with the second application cryptographic key to a second application, and the second application provides the credential encrypted with the second application cryptographic key to a storage application server, wherein the storage application server decrypts the credential encrypted with another second application cryptographic key of the second application key pair, and then (i) stores the credential or a token associated with the credential and/or (ii) transmits the credential or the token associated with the credential to the second application.

17. The method of claim 16, wherein the first application cryptographic key is a symmetric key.

18. The method of claim 16, wherein the first application cryptographic key is stored at the processing computer and a corresponding first application cryptographic key is stored an authorizing entity computer that issued the credential.

19. The method of claim 16, wherein the processing computer comprises a token processing module.

20. The method of claim 16, wherein the second application cryptographic key is a symmetric key, the second application cryptographic key being different from the first application cryptographic key.

* * * * *